(12) United States Patent
Monroe et al.

(10) Patent No.: US 7,698,450 B2
(45) Date of Patent: Apr. 13, 2010

(54) METHOD AND APPARATUS FOR DISTRIBUTING DIGITIZED STREAMING VIDEO OVER A NETWORK

(76) Inventors: David A. Monroe, 740 Lincoln Center, 7800 IA 10 West, San Antonio, TX (US) 78230; Raymond R. Metzger, 6501 Adair Dr., San Antonio, TX (US) 78238

(*) Notice: Subject to any disclaimer, the term of this patent is extended or adjusted under 35 U.S.C. 154(b) by 1264 days.

(21) Appl. No.: 11/071,007

(22) Filed: Mar. 3, 2005

(65) Prior Publication Data
US 2005/0144296 A1     Jun. 30, 2005

Related U.S. Application Data

(63) Continuation of application No. 09/716,141, filed on Nov. 17, 2000, now abandoned.

(51) Int. Cl.
*G06F 15/16* (2006.01)

(52) U.S. Cl. .................. 709/231; 709/218; 709/232

(58) Field of Classification Search .................. 709/231
See application file for complete search history.

(56) References Cited

U.S. PATENT DOCUMENTS

| | | |
|---|---|---|
| 4,646,140 A | 2/1987 | Bailey et al. |
| 4,771,987 A | 9/1988 | Priest |
| 4,857,912 A | 8/1989 | Everett, Jr. et al. |

(Continued)

FOREIGN PATENT DOCUMENTS

EP     532110     3/1993

(Continued)

OTHER PUBLICATIONS

Apr. 1966, Apollo Unified S-Band System, NASA-Goddard Space Flight Center, Greenbelt, Maryland.

(Continued)

*Primary Examiner*—Hassan Phillips
*Assistant Examiner*—Adam Cooney

(57) ABSTRACT

Continuous streaming video is conditioned for display at a remote monitor adapted for receiving and playing a streaming video file of a discrete length. The continuous streaming video has no known beginning of data signal and no known end of data signal, and an arbitrary beginning of data signal is assigned to the streaming video in mid-stream and an arbitrary end of data signal is assigned to the streaming video for identifying the length of the video stream and for making it compatible with the display platform. The continuous streaming video may be time stamped, and the beginning of data signal may be arbitrarily assigned a zero value for identifying an artificial beginning of the file. Specifically, the each time stamp received may be calculated by resetting each time stamp received time stamp with a value of the current time stamp minus first time stamp received, whereby the first time stamp received is set to zero and additional time stamps are counted from the first time stamp received. The encoded video signal may be viewed by more than one user, wherein the streaming video signal is sent to a multicast group address for forwarding the stream identified recipients, with a multicast routing technique used for determining that multiple recipients are located on one specific network path or path segment, wherein only one copy of the video signal is sent along that path.

20 Claims, 4 Drawing Sheets

MULTIPLE VIDEO ENCODERS

U.S. PATENT DOCUMENTS

| | | | |
|---|---|---|---|
| 4,910,692 A | 3/1990 | Outram | |
| 5,023,901 A | 6/1991 | Sloan | |
| 5,091,780 A | 2/1992 | Pomerleau | |
| 5,109,278 A | 4/1992 | Erickson et al. | |
| 5,111,291 A | 5/1992 | Erickson | |
| 5,243,530 A | 9/1993 | Stanifer et al. | |
| 5,258,837 A | 11/1993 | Gormley | |
| 5,268,698 A | 12/1993 | Smith, Sr. et al. | |
| 5,299,971 A | 4/1994 | Hart | |
| 5,432,838 A | 7/1995 | Purchase et al. | |
| 5,440,337 A | 8/1995 | Henderson et al. | |
| 5,440,343 A | 8/1995 | Parulski | |
| 5,446,491 A | 8/1995 | Shibata et al. | |
| 5,463,595 A | 10/1995 | Rodhall et al. | |
| 5,469,371 A | 11/1995 | Bess | |
| 5,479,206 A | 12/1995 | Ueno | |
| 5,497,149 A | 3/1996 | Fast | |
| 5,497,419 A | 3/1996 | Hill | |
| 5,508,736 A | 4/1996 | Cooper | |
| 5,530,440 A | 6/1996 | Denzer et al. | |
| 5,546,072 A | 8/1996 | Creuseremee et al. | |
| 5,550,646 A | 8/1996 | Hassan | |
| 5,557,254 A | 9/1996 | Johnson et al. | |
| 5,557,278 A | 9/1996 | Piccirillo et al. | |
| 5,587,928 A | 12/1996 | Jones et al. | |
| 5,589,209 A | 12/1996 | Cortjens et al. | |
| 5,598,167 A | 1/1997 | Zjderhand | |
| 5,598,209 A | 1/1997 | Cortjens et al. | |
| 5,602,585 A | 2/1997 | Dickinson et al. | |
| 5,612,668 A | 3/1997 | Scott | |
| 5,627,753 A | 5/1997 | Brankin et al. | |
| 5,629,691 A | 5/1997 | Jain | |
| 5,636,122 A | 6/1997 | Shah et al. | |
| 5,642,285 A | 6/1997 | Woo | |
| 5,666,157 A | 9/1997 | Aviv | |
| 5,670,961 A | 9/1997 | Tomote et al. | |
| 5,677,979 A | 10/1997 | Squicciarini et al. | |
| 5,712,679 A | 1/1998 | Coles | |
| 5,712,899 A | 1/1998 | Pace, II | |
| 5,714,948 A | 2/1998 | Farmakis et al. | |
| 5,742,233 A | 4/1998 | Hoffman et al. | |
| 5,742,336 A | 4/1998 | Lee | |
| 5,748,147 A | 5/1998 | Bickley et al. | |
| 5,751,346 A | 5/1998 | Dozier | |
| 5,777,551 A | 7/1998 | Hess | |
| 5,777,580 A | 7/1998 | Janky et al. | |
| 5,793,416 A | 8/1998 | Rostoker et al. | |
| 5,828,848 A * | 10/1998 | MacCormack et al. | 709/247 |
| 5,835,059 A | 11/1998 | Nadel et al. | |
| 5,850,180 A | 12/1998 | Hess | |
| 5,905,461 A | 5/1999 | Neher | |
| 5,915,069 A | 6/1999 | Nishijima | |
| 5,917,425 A | 6/1999 | Crimmins et al. | |
| 5,926,209 A | 7/1999 | Glatt | |
| 5,938,706 A | 8/1999 | Feldman | |
| 5,982,418 A | 11/1999 | Ely | |
| 5,983,263 A | 11/1999 | Rothrock et al. | |
| 5,995,141 A | 11/1999 | Hieda | |
| 6,002,427 A | 12/1999 | Kipust | |
| 6,011,901 A * | 1/2000 | Kirsten | 386/123 |
| 6,035,212 A | 3/2000 | Rostoker et al. | |
| 6,036,086 A | 3/2000 | Sizer, II | |
| 6,067,642 A | 5/2000 | Kuno | |
| 6,069,655 A | 5/2000 | Seeley | |
| 6,078,850 A | 6/2000 | Kane et al. | |
| 6,091,777 A * | 7/2000 | Guetz et al. | 375/240.11 |
| 6,100,806 A | 8/2000 | Gaukel | |
| 6,100,964 A | 8/2000 | De Cremiers | |
| 6,133,941 A | 10/2000 | Ono | |
| 6,160,544 A | 12/2000 | Hayashi et al. | |
| 6,166,729 A | 12/2000 | Acosta et al. | |
| 6,167,255 A | 12/2000 | Kennedy, III et al. | |
| 6,172,605 B1 | 1/2001 | Matsumoto | |
| 6,173,317 B1 * | 1/2001 | Chaddha et al. | 709/219 |
| 6,185,737 B1 | 2/2001 | Northcutt et al. | |
| 6,208,376 B1 | 3/2001 | Tanaka | |
| 6,208,379 B1 | 3/2001 | Oya et al. | |
| 6,219,736 B1 | 4/2001 | Klingman | |
| 6,226,031 B1 | 5/2001 | Barraclough et al. | |
| 6,229,850 B1 | 5/2001 | Linzer et al. | |
| 6,498,791 B2 | 5/2001 | Pickett | |
| 6,243,056 B1 | 6/2001 | Jachimowicz | |
| 6,259,475 B1 | 7/2001 | Ramachandran et al. | |
| 6,271,752 B1 | 8/2001 | Vaios | |
| 6,282,488 B1 | 8/2001 | Castor et al. | |
| 6,285,398 B1 | 9/2001 | Shinsky | |
| 6,292,098 B1 | 9/2001 | Ebata | |
| 6,323,897 B1 | 11/2001 | Kogane et al. | |
| 6,345,279 B1 | 2/2002 | Li et al. | |
| 6,366,578 B1 | 4/2002 | Johnson | |
| 6,385,244 B1 | 5/2002 | Morad et al. | |
| 6,385,772 B1 | 5/2002 | Courtney | |
| 6,386,038 B1 | 5/2002 | Lewis, III et al. | |
| 6,389,340 B1 | 5/2002 | Rayner | |
| 6,396,514 B1 | 5/2002 | Kohno et al. | |
| 6,421,064 B1 | 7/2002 | Lemelson et al. | |
| 6,424,370 B1 | 7/2002 | Courtney | |
| 6,493,466 B1 | 12/2002 | Honda et al. | |
| 6,504,479 B1 | 1/2003 | Lemons | |
| 6,512,919 B2 | 1/2003 | Ogasawara | |
| 6,549,130 B1 | 4/2003 | Joso | |
| 6,564,380 B1 * | 5/2003 | Murphy | 725/86 |
| 6,505,169 B1 | 6/2003 | Bhagavath et al. | |
| 6,584,082 B1 | 6/2003 | Willis et al. | |
| 6,608,559 B1 | 8/2003 | Lemelson et al. | |
| 6,628,835 B1 | 9/2003 | Brill | |
| 6,631,322 B1 | 10/2003 | Arthur et al. | |
| 6,633,333 B1 | 10/2003 | Spencer | |
| 6,643,779 B1 | 11/2003 | Leung et al. | |
| 6,646,676 B1 | 11/2003 | DeGrace | |
| 6,658,091 B1 | 12/2003 | Naidoo et al. | |
| 6,658,158 B2 | 12/2003 | Fukuhara et al. | |
| 6,662,649 B1 | 12/2003 | Knight et al. | |
| 6,677,979 B1 | 1/2004 | Westfield | |
| 6,680,746 B2 | 1/2004 | Kawai et al. | |
| 6,690,411 B2 | 2/2004 | Naidoo et al. | |
| 6,697,105 B1 | 2/2004 | Kato et al. | |
| 6,698,012 B1 | 2/2004 | Amini et al. | |
| 6,711,622 B1 * | 3/2004 | Fuller et al. | 709/231 |
| 6,731,805 B2 | 5/2004 | Brodsky et al. | |
| 6,741,586 B1 | 5/2004 | Schuster | |
| 6,675,386 B1 | 6/2004 | Hendricks et al. | |
| 6,778,171 B1 | 8/2004 | Kikinis | |
| 6,831,917 B1 | 12/2004 | Cheriton | |
| 6,853,739 B2 | 2/2005 | Kyle | |
| 6,891,566 B2 | 5/2005 | Marchese | |
| 6,930,709 B1 | 8/2005 | Creamer et al. | |
| 6,940,545 B1 | 9/2005 | Ray et al. | |
| 7,023,913 B1 | 4/2006 | Monroe | |
| 7,027,719 B1 | 4/2006 | Schneider et al. | |
| 7,152,546 B2 | 12/2006 | Bernath | |
| 7,221,809 B2 | 5/2007 | Geng | |
| 7,231,481 B2 | 6/2007 | Scott | |
| 7,298,400 B2 | 11/2007 | Taguchi | |
| 7,367,046 B1 | 4/2008 | Aggarwal et al. | |
| 2001/0037509 A1 | 11/2001 | Kligman | |
| 2002/0003575 A1 | 1/2002 | Marchese | |
| 2002/0051061 A1 | 5/2002 | Peters et al. | |
| 2002/0069265 A1 | 6/2002 | Bountour et al. | |
| 2002/0097917 A1 | 7/2002 | Nelson et al. | |
| 2002/0120675 A1 | 8/2002 | Everett et al. | |
| 2002/0122394 A1 | 9/2002 | Whitmore | |
| 2002/0141732 A1 | 10/2002 | Reese et al. | |
| 2003/0071899 A1 | 4/2003 | Joso | |

| | | | |
|---|---|---|---|
| 2003/0120802 A1 | 6/2003 | Kohno | |
| 2004/0052450 A1 | 3/2004 | Morrison | |
| 2004/0208198 A1 | 10/2004 | Christie | |
| 2005/0036036 A1 | 2/2005 | Stevenson et al. | |
| 2005/0055727 A1 | 3/2005 | Creamer et al. | |
| 2005/0120128 A1 | 6/2005 | Willes et al. | |
| 2005/0130803 A1 | 6/2005 | Rastegar et al. | |
| 2005/0146623 A1 | 7/2005 | Juen | |

FOREIGN PATENT DOCUMENTS

| | | |
|---|---|---|
| EP | 613110 | 8/1994 |
| EP | 744630 | 11/1996 |
| EP | 613111 | 8/1998 |
| JP | HEI-10-66058 | 3/1998 |
| JP | A-10-155040 | 6/1998 |
| WO | WO90/04242 | 4/1990 |
| WO | WO 90/05426 | 5/1990 |
| WO | WO98/52174 | 11/1999 |

OTHER PUBLICATIONS

Nov. 24, 1976, Telexis ViaNet General Information Booklet Version 1.3.
2000, ViaNet 3000 Administrator's Manual Version 1.1-NetXpress Video by Telexis, Kanata, Ontario, Canada.
1999 Vianet 3000 Operator Manual Version 1.0-NetXpress Video by Telexis, Kanata, Ontario, Canada.
1999 ViaNet 3000 Administrator Manual Version 1.0-NetXpress Video by Telexis, Kanata, Ontario, Canada.
1999 ViaNet 3000 Instruction Manual Operator's Revision 1-NetXpress Video by Telexis, Kanata, Ontario, Canada.

* cited by examiner

FIG.1 MULTIPLE VIDEO ENCODERS

Fig. 2 MULTICAST ADDRESS RESOLUTION

SCREEN LAYOUT

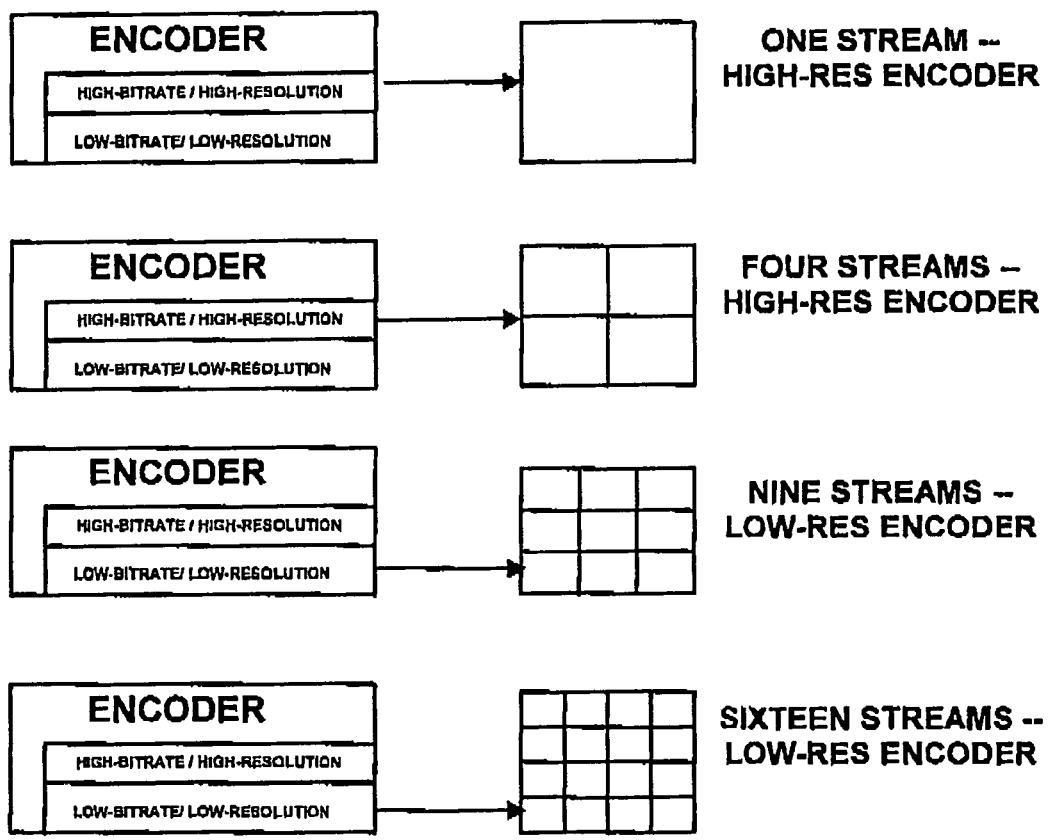
FIG. 4 -- BANDWIDTH CONSERVATION

METHOD AND APPARATUS FOR DISTRIBUTING DIGITIZED STREAMING VIDEO OVER A NETWORK

This invention is a continuation of patent application Ser. No. 09/716,141, filed Nov. 17, 2000 now abandoned entitled "Method and Apparatus for Distributing Digitized Streaming Video Over A Network."

BACKGROUND OF THE INVENTION

1. Field of the Invention

The invention is generally related to digital video transmission systems and is specifically directed to a method and apparatus for compressing and distributing digitized video over a network for supporting the transmission of live, near real-time video data.

2. Description of the Prior Art

Cameras employ digital encoders that produce industry-standard digital video streams such as, by way of example, MPEG-1 streams. The use of MPEG-1 streams is advantageous due to the low cost of the encoder hardware, and to the ubiquity of software MPEG-1 players. However, difficulties arise from the fact that the MPEG-1 format was designed primarily to support playback of recorded video from a video CD, rather than to support streaming of 'live' sources such as surveillance cameras and the like.

MPEG system streams contain multiplexed elementary bit streams containing compressed video and audio. Since the retrieval of video and audio data form the storage medium (or network) tends to be temporally discontinuous, it is necessary to embed certain timing information in the respective video and audio elementary streams. In the MPEG-1 standard, these consist of Presentation Timestamps (PTS) and, optionally, Decoding Timestamps (DTS).

On desktop computers, it is common practice to play MPEG-1 video and audio using a commercially available software package, such as, by way of example, the Microsoft Windows Media Player. This software program may be run as a standalone application. Otherwise, components of the player may be embedded within other software applications.

Media Player, like MPEG-1 itself, is inherently file-oriented and does support playback of continuous sources such as cameras via a network. Before Media Player begins to play back a received video file, it must first be informed of certain parameters including file name and file length. This is incompatible with the concept of a continuous streaming sources, which may not have a filename and which has no definable file length.

Moreover, the time stamping mechanism used by Media Player is fundamentally incompatible with the time stamping scheme standardized by the MPEG-1 standard. MPEG-1 calls out a time stamping mechanism which is based on a continuously incrementing 94 kHz clock located within the encoder. Moreover, the MPEG-1 standard assumes no Beginning-of-File marker, since it is intended to produce a continuous stream.

Media Player, on the other hand, accomplishes time stamping by counting 100's of nanoseconds since the beginning of the current file.

SUMMARY OF INVENTION

The video system of the subject invention is adapted for supporting the use of a local-area-network (LAN) or wide-area-network (WAN), or a combination thereof, for distributing digitized camera video on a real-time or "near" real-time basis. Certain algorithms or methods used in the camera encoders and in the display stations are disclosed and form the nexus of the invention.

The subject invention is specifically directed to a method for recognizing and playing a continuous streaming video data signal with no known beginning of data signal and no known end of data signal, by assigning an arbitrary beginning of data signal to the streaming video in mid-stream, and assigning an arbitrary end of data signal to the streaming video for identifying the length of the video stream. The continuous streaming video may be time stamped. In the described embodiment the beginning of data signal is assigned by arbitrarily assigning a zero value to the first time stamp received. The end of data signal is arbitrarily set at a number sufficiently high to accommodate the functional life of the system based on the capability of the player platform utilized. In the preferred embodiment, the end of data signal is set at the highest number achievable by the player platform.

In the preferred embodiment of the invention, the system uses a plurality of video cameras, disposed around a facility to view scenes of interest. Each camera captures the desired scene, digitizes the resulting video signal, compresses the digitized video signal, and sends the resulting compressed digital video stream to a multicast address. One or more display stations may thereupon view the captured video via the intervening network.

In an exemplary embodiment, a common MPEG-1 encoder is used to perform the actual MPEG compression of a digitized camera signal. An example encoder is a W99200F IC, produced by Winbond Corporation of Taiwan. This IC produces an MPEG Video Elementary Stream that contains the appropriate PTS information as mandated by the MPEG standard. A proprietary algorithm converts the MPEG PTS data into the format required by the Microsoft Media Player.

When invoking Media Player to view the streaming camera video, it is first necessary to inform Media Player of the file length since the camera produces a stream rather than a discrete file, the file length is undefined. In the exemplary embodiment, the Media Player's 63-bit file length variables are all set to 1. Media Player compares this value to a free-running counter that counts ticks of a 10 MHz clock. This counter is normally initialized to zero at the beginning of the file. Given 63 bits, this permits a maximum file length of approximately thirty thousand years. This effectively allows the system to play streaming sources.

A problem with this approach arises when additional users attempt to connect to a stream that is already in progress. Media Player expects that file length and other related information is normally sent only once, in a file header, and is not periodically repeated. Thus, users connecting later will not receive the file length information contained in the header. This problem is resolved by developing a software 'front-end' filter that examines and modifies data being passed from the network to Media Player. This software formulates a dummy video file header, and passes it to Media Player. The filter then examines the incoming video stream, finds the next sequential Video Header, and thereupon begins passing the networked video data to the Media Player decoder and renderer. This effectively allows users to 'tune in late', by providing Media Player with an appropriate file header.

A further issue arises when the networked video data is passed to Media Player. Since the user has connected to the video stream after the start of the file, the first timestamp received by Media Player will be non-zero, which causes an error. To overcome this problem, the novel front-end software filter replaces each received timestamp with a value calculated as the current timestamp minus first timestamp received.

This effectively re-numbers the timestamp in the local video stream starting with an initial value of zero.

The subject invention permits any given source of encoded video to be viewed by more than one user. While this could hypothetically be accomplished by sending each recipient a unique copy of the video stream, such an approach is tremendously wasteful of network bandwidth. The subject invention resolves this by transmitting one copy of the stream to multiple recipients, via Multicast Routing. This approach is commonly used on the Internet, and is the subject of various Internet Standards (RFC's). In essence, a video source sends its video stream to a Multicast Group Address, which exists as a port on a Multicast-Enabled network router or switch. It will be understood by those skilled in the art that the terms "router and/or switch" as used herein is intended as a generic term for receiving and rerouting a plurality of signals. Hubs, switched hubs and intelligent routers are all included in the terms "router and/or switch" as used herein. The router or switch then forwards the stream only to IP addresses having known recipients. Furthermore, if the router or switch can determine that multiple recipients are located on one specific network path or path segment, the router or switch sends only one copy of the stream to that path. From a client's point of view, the client need only connect to a particular Multicast Group Address to receive the stream.

At present there is not a standardized mechanism for dynamically assigning these Multicast Group Addresses in a way that is known to be globally unique. This differs from the ordinary Class A, B, or C IP address classes. In these classes, a regulatory agency assigns groups of IP addresses to organizations upon request, and guarantees that these addresses are globally unique. Once assigned this group of IP addresses, a network administrator may allocate these addresses to individual hosts, either statically or dynamically using DHCP or equivalent network protocols. This is not true of Multicast Group Addresses; they are not assigned by any centralized body and their usage is therefore not guaranteed to be globally unique. Thus, in accordance with the subject invention as presently configured, each video encoder must posses two unique IP addresses—the unique Multicast Address used by the encoder to transmit the video stream, and the ordinary Class A, B, or C address used for more mundane purposes. Therefore, it is necessary to provide a means to associate the two addresses, for any given encoder.

Pending the release of improved Internet Group Multicast Protocols, The subject invention provides a mechanism for associating the two addresses. This method establishes a sequential transaction between the requesting client and the desired encoder.

First, the client requesting the video stream identifies the IP address of the desired encoder. Once the encoder's IP address is known, the client obtains a small file from the desired encoder, using FTP, TFTP or other appropriate file transfer protocol over TCP/IP. The file, as received by the requesting client, contains various operating parameters of the encoder including frame rate, UDP bitrate, image size, and most importantly, the Multicast Group Address associated with the encoder's IP address. The client then launches an instance of Media Player, initializes the front-end filter, and directs Media Player to receive the desired video stream from the defined Multicast Group Address.

Streaming video produced by the various encoders is transported over a generic IP network to one or more users. User workstations contain one or more ordinary PC's, each with an associated video monitor. The user interface is provided by an HTML application within an industry-standard browser, for example, Microsoft Internet Explorer.

Streaming video signals tend to be bandwidth-intensive. To address this, each encoder is equipped with at least two MPEG-1 encoders. When the encoder is initialized, these two encoders are programmed to encode the same camera source into two distinct streams: one low-resolution low-bitrate stream, and one higher-resolution, higher-bitrate stream.

It is, therefore, and object and feature of the subject invention to provide the means and method for displaying "live" streaming video over a commercially available media player system.

It is a further object and feature of the subject invention to provide the means and method for permitting multiple users to access and view the live streaming video at different time, while in process without interrupting the transmission.

It is a further object and feature of the subject invention to permit conservation of bandwidth by incorporating a multiple resolution scheme permitting resolution to be selected dependent upon image size and use of still versus streaming images.

It is an additional object and feature of the subject invention to provide for a means and method for identifying an artificial file length for a continuous streaming video.

It is also an object and feature of the subject invention to provide a means and method for artificially identifying a "beginning-of-file" signal for a continuous streaming video.

It is a further object and feature of the subject invention to provide for a means and method for combining an IP address in accordance with accepted nomenclature with an encoder address to provide a unique global address for each encoder associated with a streaming "live" video system.

Other objects and feature of the subject invention will be readily apparent from the accompanying drawings and detailed description of the preferred embodiment.

BRIEF DESCRIPTION OF THE DRAWINGS

FIG. 4 is an illustration of the use of the bandwidth conservation scheme of the subject invention.

DESCRIPTION OF THE PREFERRED EMBODIMENT

Figure 1:
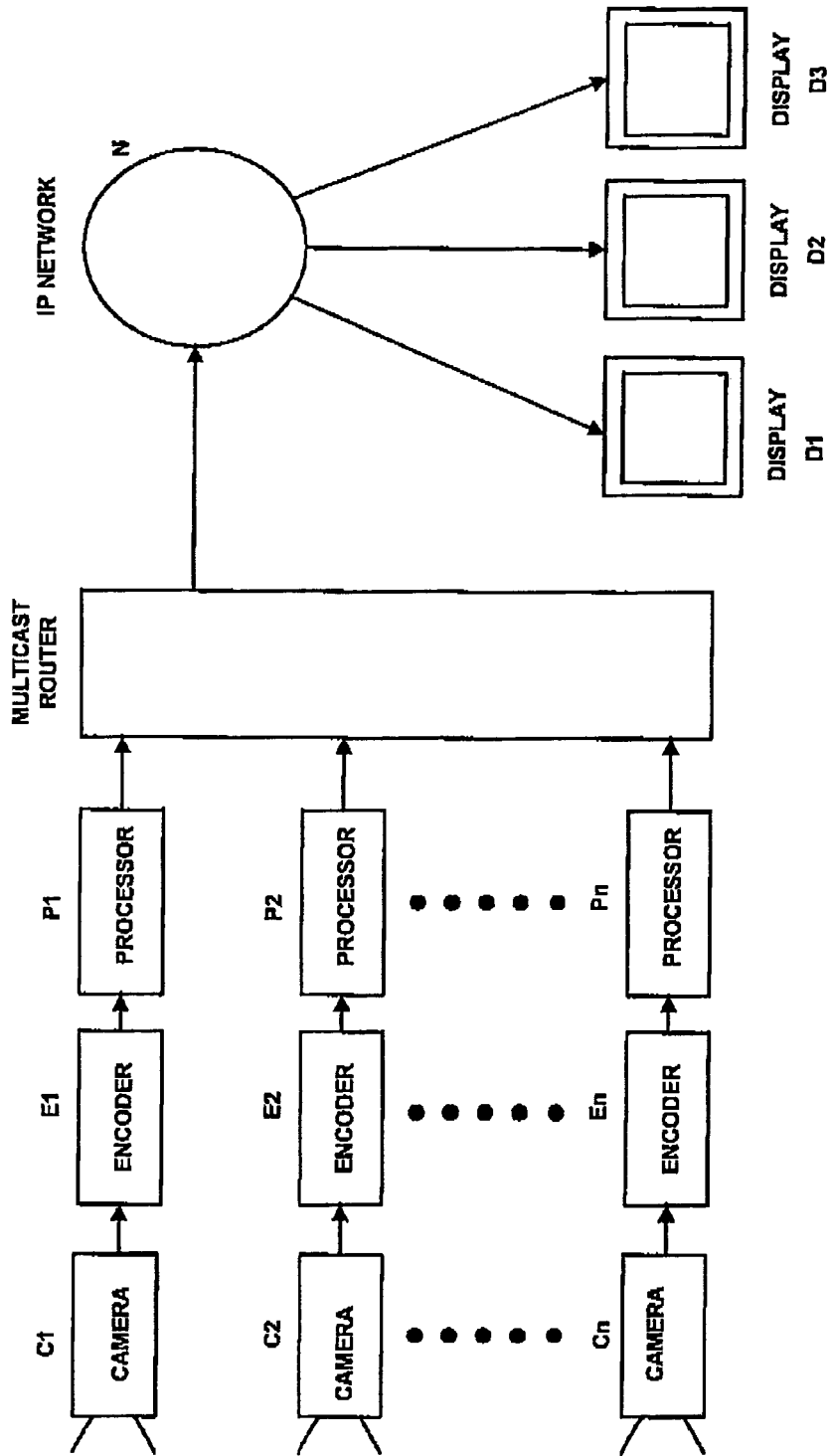
FIG. 1 is a block diagram of a typical multi-camera system in accordance with the subject invention.

The video surveillance system of the subject invention is specifically adapted for distributing digitized camera video on a real-time or near real-time basis over a LAN and/or a WAN. The system uses a plurality of video cameras C1, C2 . . . Cn, disposed around a facility to view scenes of interest. Each camera captures the desired scene, digitizes the resulting video signal at a dedicated encoder E1, E2 . . . En, respectively, compresses the digitized video signal at the respective compressor processor P1, P2 . . . Pn, and sends the resulting compressed digital video stream to a multicast address router R. One or more display stations D1, D2 . . . . Dn may thereupon view the captured video via the intervening network N. The network may be hardwired or wireless, or a combination, and may either a Local Area Network (LAN) or a Wide Area Network (WAN), or both.

The preferred digital encoders E1, E2 . . . En produce industry-standard MPEG-1 digital video streams. The use of MPEG-1 streams is advantageous due to the low cost of the encoder hardware, and to the ubiquity of software MPEG-1 players. However, difficulties arise from the fact that the MPEG-1 format was designed primarily to support playback of recorded video from a video CD, rather than to support streaming of 'live' sources such as cameras.

MPEG-1 system streams contain multiplexed elementary bit streams containing compressed video and audio. Since the retrieval of video and audio data from the storage medium (or network) tends to be temporally discontinuous, it is necessary to embed certain timing information in the respective video and audio elementary streams. In the MPEG-1 standard, these consist of Presentation Timestamps (PTS) and, optionally, Decoding Timestamps (DTS).

On desktop computers, it is common practice to play MPEG-1 video and audio using a proprietary software package such as, by way of example, the Microsoft Windows Media Player. This software program may be run as a standalone application, otherwise components of the player may be embedded within other software applications.

Media Player, like MPEG-1 itself, is inherently file-oriented and does support playback of continuous sources such as cameras via a network. Before Media Player begins to play back a received video file, it must first be informed of certain parameters including file name and file length. This is incompatible with the concept of a continuous streaming source, which may not have a filename and which has no definable file length.

Moreover, the time stamping mechanism used by Media Player is fundamentally incompatible with the time stamping scheme standardized by the MPEG-1 standard. MPEG-1 calls out a time stamping mechanism which is based on a continuously incrementing 94 kHz clock located within the encoder. Moreover, the MPEG-1 standard assumes no Beginning-of-File marker, since it is intended to produce a continuous stream. In the present invention, a common MPEG-1 encoder IC is used to perform the actual MPEG compression of a digitized camera signal. The IC selected is a W99200F IC, produced by Winbond Corporation of Taiwan. This IC produces an MPEG Video Elementary Stream that contains the appropriate PTS information as mandated by the MPEG standard.

When invoking Media Player to view the streaming camera video, it is first necessary to inform Media Player of the file length. Since the camera produces a stream rather than a discrete file, the file length is undefined. In order to overcome this problem all of the Media Player's 63-bit file length variables are set to 1. Media Player compares this value to a free-running counter that counts ticks of a 10 MHz clock. This counter is normally initialized to zero at the beginning of the file. Given 63 bits, this permits a maximum file length of approximately thirty thousand years, longer than the useful life of the product or, presumably, it's users. This effectively allows the system to play streaming sources.

The next problem arises when additional users attempt to connect to a stream that is already in progress. Media Player expects that file length and other related information is normally sent only once, in a file header, and is not periodically repeated. Thus, users connecting later will not receive the file length information contained in the header. The subject invention has overcome this problem by developing a software 'front-end' filter that examines and modifies data being passed from the network to Media Player. This software formulates a dummy video file header, and passes it to Media Player. The filter then examines the incoming video stream, finds the next sequential Video Header, and thereupon begins passing the networked video data to the Media Player decoder and renderer. This effectively allows users to 'tune in late', by providing Media Player with an appropriate file header.

A further problem arises when the networked video data is passed to Media Player. Since the user has connected to the video stream after the start of the file, the first time stamp received by Media Player will be non-zero, which causes an error. To overcome this problem, the front-end software filter replaces each received timestamp with a value of (current time stamp minus first time stamp received), which effectively re-numbers the timestamp in the local video stream starting with an initial value of zero.

Any given source of encoded video may be viewed by more than one client. This could hypothetically be accomplished by sending each recipient a unique copy of the video stream. However, this approach is tremendously wasteful of network bandwidth. A superior approach is to transmit one copy of the stream to multiple recipients, via Multicast Routing. This approach is commonly used on the Internet, and is the subject of various Internet Standards (RFC's). In essence, a video source sends its' video stream to a Multicast Group Address, which exists as a port on a Multicast-Enabled network router or switch. The router or switch then forwards the stream only to IP addresses that have known recipients. Furthermore, if the router or switch can determine that multiple recipients are located on one specific network path or path segment, the router or switch sends only one copy of the stream to that path.

From a client's point of view, the client need only connect to a particular Multicast Group Address to receive the stream. A range of IP addresses has been reserved for this purpose; essentially all IP addresses from 224.0.0.0 to 239.255.255.255 have been defined as Multicast Group Addresses.

Unfortunately, there is not currently a standardized mechanism to dynamically assign these Multicast Group Addresses, in a way that is known to be globally unique. This differs from the ordinary Class A, B, or C IP address classes. In these classes, a regulatory agency assigns groups of IP addresses to organizations upon request, and guarantees that these addresses are globally unique. Once assigned this group of IP addresses, a network administrator may allocate these addresses to individual hosts, either statically or dynamically DHCP or equivalent network protocols. This is not true of Multicast Group Addresses; they are not assigned by any centralized body and their usage is therefore not guaranteed to be globally unique.

Each encoder must possess two unique IP addresses—the unique Multicast Address used by the encoder to transmit the video stream, and the ordinary Class A, B, or C address used for more mundane purposes. It is thus necessary to provide a means to associate the two addresses, for any given encoder.

Figure 2:
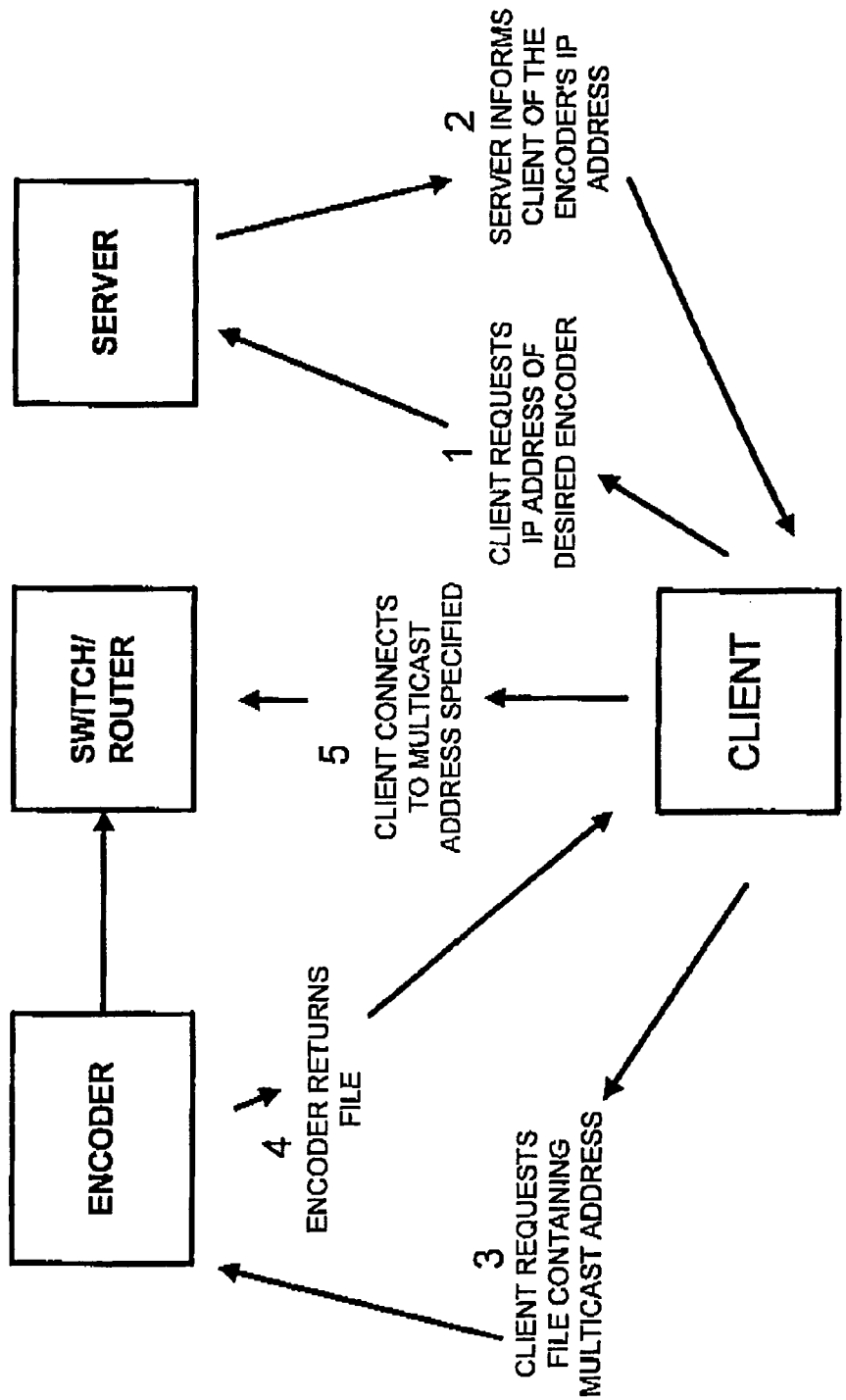
FIG. 2 is an illustration of the scheme for multicast address resolution.

The subject invention includes a mechanism for associating the two addresses. This method establishes a sequential transaction between the requesting client and the desired encoder. An illustration of this technique is shown in FIG. 2.

First, the client requesting the video stream identifies the IP address of the desired encoder. This is normally done via graphical methods, described more fully below. Once the encoder's IP address is known, the client obtains a small file from an associated server, using FTP, TFTP or other appropriate file transfer protocol over TCP/IP. The file, as received by the requesting client, contains various operating parameters of the encoder including frame rate, UDP bitrate, image size, and most importantly, the Multicast Group Address associated with the encoder's IP address. The client then launches an instance of Media Player, initializes the previously described front end filter, and directs Media Player to receive the desired video stream from the defined Multicast Group Address.

First, the client requesting the video stream identifies the IP address of the desired encoder. This is normally done via graphical methods, described more fully below. Once the encoder's IP address is known, the client obtains a small file from an associated server, using FTP, TFTP or other appropriate file transfer protocol over TCP/IP. The file, as received by the requesting client, contains various operating parameters of the encoder including frame rate, UDP bitrate, image size, and most importantly, the Multicast Group Address associated with the encoder's IP address. The client then launches an instance of Media Player, initializes the previously described front end filter, and directs Media Player to receive the desired video stream from the defined Multicast Group Address.

Streaming video produced by the various encoders is transported over a generic IP network to one or more users. User workstations contain one or more ordinary PC's, each with an associated video monitor. The user interface is provided by an HTML application within an industry-standard browser, specifically Microsoft Internet Explorer.

Figure 3:
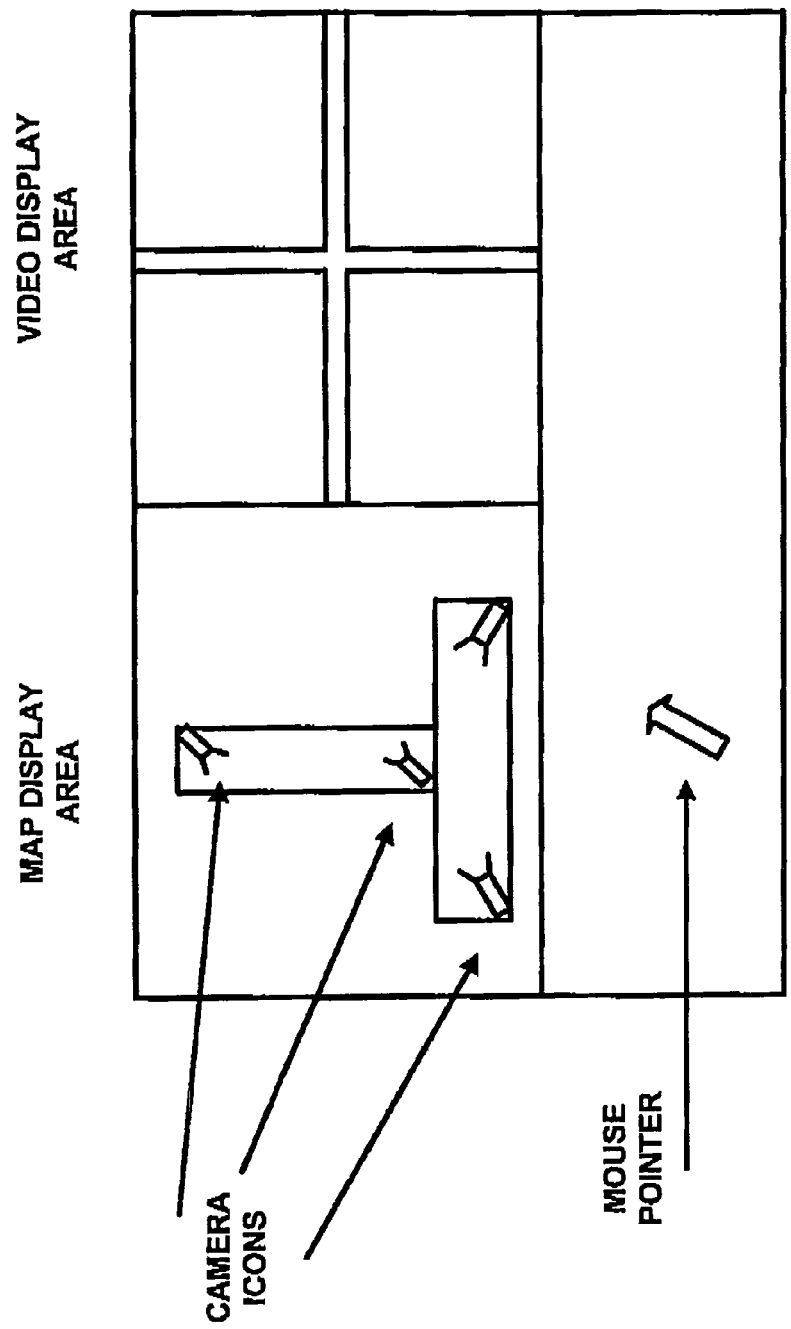
FIG. 3 illustrates a typical screen layout.

One aspect of the invention is the intuitive and user-friendly method for selecting cameras to view. The breadth of capability of this feature is shown in FIG. 3. The main user interface screen provides the user with a map of the facility, which is overlaid with camera-shaped icons depicting location and direction of the various cameras and encoders. This main user interface has, additionally, a section of the screen dedicated to displaying video from the selected cameras.

The video display area of the main user interface may be arranged to display a single video image, or may be subdivided by the user into arrays of 4, 9, or 16 smaller video display areas. Selection of cameras, and arrangement of the display area, is controlled by the user using a mouse and conventional Windows user-interface conventions. Users may:

Select the number of video images to be displayed within the video display area. This is done by pointing and clicking on icons representing screens with the desired number of images.

Display a desired camera within a desired 'pane' in the video display area. This is done by pointing to the desired area on the map, then 'dragging' the camera icon to the desired pane.

Edit various operating parameters of the encoders. This is done by pointing to the desired camera, the right-clicking the mouse. The user interface then drops a dynamically generated menu list that allows the user to adjust the desired encoder parameters.

Some sample source is listed below:

```
// this function responds to a dragStart event on a camera
function cameraDragStart(i)
{
event.dataTransfer.setData("text",currSite.siteMaps[currSite.currMap]
.hotSpots[i].camera.id);
    dragSpot = currSite.siteMaps[currSite.currMap].hotSpots[i];
    event.dataTransfer.dropEffect = "copy";
    dragging = true;
    event.cancelBubble = true;
}
// this function responds to a dragStart event on a cell
// we might be dragging a hotSpot or a zone
function cellDragStart(i)
{
  }
  }
// this function responds to a drop event on a cell input element
function drop(i)
{
    if (dragSpot != null)                       // dragging a
hotSpot
```

```
    {
    }
    else if (dragZone != null)                  // dragging a
zone object
    {
        currMonitor.zones[i] = dragZone;        // set the cell zone
        dragZone = null;                        // null
dragZone
        zoneVideo(currMonitor.id, i);           // start the
video
    }
    else
    {
    }
    else
    {
        dropCameraId(currMonitor,d,i);          // setup hotSpot
        startMonitorVideo(currMonitor, i);      // start the
video
        displayCells( );                        //
redisplay the monitor cells
    }
    }
    dragging = false;
    event.cancelBubble = true;
}
```

In the foregoing code, the function:
event.dataTransfer.setData("text",currSite.siteMaps [currSite.currMap].hotspots [i].camera.id)
retrieves the IP address of the encoder that the user has clicked. The subsequent function startMonitorVideo (currMonitor, i) passes the IP address of the selected encoder to an ActiveX control that then decodes and renders video from the selected source.

It is often the case that the user may wish to observe more than 16 cameras, as heretofore discussed. To support this, the system allows the use of additional PC's and monitors. The additional PC's and monitors operate under the control of the main user application. These secondary screens do not have the facility map as does the main user interface. Instead, these secondary screens use the entire screen area to display selected camera video.

These secondary screens would ordinarily be controlled with their own keyboards and mice. Since it is undesirable to clutter the user's workspace with multiple mice, these secondary PC's and monitors operate entirely under the control of the main user interface. To support this, a series of button icons are displayed on the main user interface, labeled, for example, PRIMARY, 2, 3, and 4. The video display area of the primary monitor then displays the video that will be displayed on the selected monitor. The primary PC, then, may control the displays on the secondary monitors. For example, a user may click on the '2' button, which then causes the primary PC to control monitor number two. When this is done, the primary PC's video display area also represents what will be displayed on monitor number two. The user may then select any desired camera from the map, and drag it to a selected pane in the video display area. When this is done, the selected camera video will appear in the selected pane on screen number 2.

Streaming video signals tend to be bandwidth-intensive. The subject invention provides a method for maximizing the use of available bandwidth by incorporating multiple resolution transmission and display capabilities. Since each monitor is capable of displaying up to 16 separate video images, the bandwidth requirements of the system can potentially be enormous. It is thus desirable to minimize the bandwidth requirements of the system.

To address this, each encoder is equipped with at least two MPEG-1 encoders. When the encoder is initialized, these two encoders are programmed to encode the same camera source into two distinct streams: one low-resolution low-bitrate stream, and one higher-resolution, higher-bitrate stream.

When the user has configured the video display area to display a single image, that image is obtained from the desired encoder using the higher-resolution, higher-bitrate stream. The same is true when the user subdivides the video display area into a 2×2 array; the selected images are obtained from the high-resolution, high-bitrate streams from the selected encoders. The network bandwidth requirements for the 2×2 display array are four times the bandwidth requirements for the single image, but this is still an acceptably small usage of the network bandwidth.

However, when the user subdivides a video display area into a 3×3 array, the demand on network bandwidth is 9 times higher than in the single-display example. And when the user subdivides the video display area into a 4×4 array, the network bandwidth requirement is 16× that of a single display. To prevent network congestion, video images in a 3×3 or 4×4 array are obtained from the low-resolution, low-speed stream of the desired encoder. Ultimately, no image resolution is lost in these cases, since the actual displayed video size decreases as the screen if subdivided. If a higher-resolution image were sent by the encoder, the image would be decimated anyway in order to fit it within the available screen area.

While specific features and embodiments of the invention have been described in detail herein, it will be understood that the invention includes all of the enhancements and modifications within the scope and spirit of the following claims.

What is claimed is:

1. A method for transmitting video data from a camera over an internet protocol network to a recipient, the recipient including an executable media player application embodied in suitable media, the recipient including a processor suitable to execute the media player application, the recipient including a media player time counter, the media player time counter being incremented in relation to a media player time source, the media player application being executable upon receipt of video data including both of the following:
   a Beginning of File marker, and
   a file length identifier,
execution of the media player application with video data after receipt of both a Beginning of File marker and a file length identifier causing video data to be displayed, the method comprising:
   in the camera compressing collected video data in an MPEG compressor to provide a compressed bit stream;
   in the camera embedding with the compressed bit stream an embedded time stamp value, the embedded time stamp value including one of the following:
   a Presentation Time Stamp (PTS), and
   a Decoding Time Stamp (DTS),
the embedded time stamp value being incremented in relation to a camera time counter;
   transmitting from the camera over the network to the recipient the compressed bit stream including a sequence of video data headers, each video data header including the embedded time stamp value;
   at the recipient executing a front-end filter application with the compressed bit stream including the sequence of video data headers, the front-end filter application being embodied in suitable media, the recipient including a processor suitable to execute the front-end filter application, execution of the front-end filter application causing the sequence of video data headers to be replaced with a sequence of dummy video file headers, at least one of the dummy video file headers including a Beginning of File marker, the Beginning of File marker being provided at the recipient in the at least one dummy video file header by execution of the front-end filter application, the Beginning of File marker being a dummy marker, at least one of the dummy video file headers including a file length identifier, the file length identifier being provided at the recipient in the at least one dummy video file header by execution of the front-end filter application, the file length identifier having a dummy value not greater than a maximum file length of the media player application, the dummy value being at least sufficient to enable execution of the media player with the compressed bit stream to cause video data to be displayed while the media player time counter is incremented toward the dummy value, each of the dummy video file headers including a replacement time stamp value provided by the front-end filter application, the replacement time stamp value being calculated by subtracting from each embedded time stamp value an initial embedded time stamp value, the initial embedded time stamp value being a first embedded time stamp value in the compressed bit stream received by the front-end filter application; and
   at the recipient providing to the media player application the compressed bit stream including the sequence of dummy video file headers, execution of the media player application with the compressed bit stream being enabled by the sequence of dummy video file headers, the media player time counter being initialized to an initial counter value upon receipt of the Beginning of File marker, the media player time counter incrementing from the initial counter toward the dummy value in relation to the media player time source, execution of the media player causing the video data to be displayed in sequence from the compressed bit stream, the sequence being established by the replacement time stamp value.

2. The method of claim 1 and further comprising:
the replacement time stamp value being zero in correspondence only to the initial embedded time stamp value.

3. The method of claim 1 and further comprising:
the media player time counter being initialized to an initial counter value of zero upon receipt of the Beginning of File marker, the replacement time stamp value being zero in correspondence only to the initial embedded time stamp value.

4. The method of claim 1 and further comprising:
the media player application including a Microsoft media player platform, the media player time counter being initialized to an initial counter value of zero upon receipt of the Beginning of File marker, the replacement time stamp value being zero in correspondence only to the initial embedded time stamp value.

5. The method of claim 1 and further comprising:
the dummy value being equal to a maximum file length supported by the media player application.

6. The method of claim 5 and further comprising:
the media player application including a Microsoft media player platform having a 63-bit file length, when each variable is set to one, the maximum file length being approximately thirty thousand years.

7. A recipient computer in communication with an internet protocol network to receive from the internet protocol network video data transmitted from a camera over the internet protocol network, the recipient computer including a processor, the processor being suitable to execute a front-end filter application, the front-end filter application being embodied in memory, the recipient computer including an executable media player application embodied in memory, the recipient computer including a processor suitable to execute the media player application, the recipient computer including a media player time counter, the media player time counter being incremented in relation to a media player time source, the media player application being executable upon receipt of video data including both of the following:

a Beginning of File marker, and a file length identifier, execution of the media player application with video data after receipt of both a Beginning of File marker and a file length identifier causing video data to be displayed, the recipient computer comprising:

the front-end filter application being executable to cause a sequence of video data headers included in a compressed bit stream of video data to be replaced with a sequence of dummy video file headers, at least one of the dummy video file headers including a Beginning of File marker, the Beginning of File marker being provided at the recipient in the at least one dummy video file header by execution of the front-end filter application, the Beginning of File marker being a dummy marker, at least one of the dummy video file headers including a file length identifier, the file length identifier being provided at the recipient in the at least one dummy video file header by execution of the front-end filter application, the file length identifier having a dummy value not greater than a maximum file length of the media player application, the dummy value being at least sufficient to enable execution of the media player with the compressed bit stream to cause video data to be displayed while the media player time counter is incremented toward the dummy value, each of the dummy video file headers including a replacement time stamp value provided by the front-end filter application, the replacement time stamp value being calculated by subtracting from an embedded time stamp value in a respective one of the video data headers an initial embedded time stamp value, the initial embedded time stamp value being a first embedded time stamp value in the compressed bit stream received by the front-end filter application, the front-end filter application providing to the media player application the compressed bit stream including the sequence of dummy video file headers, execution of the media player application with the compressed bit stream being enabled by the sequence of dummy video file headers, the media player time counter being initialized to an initial counter value upon receipt of the Beginning of File marker, the media player time counter incrementing from the initial counter toward the dummy value in relation to the media player time source, execution of the media player causing the video data to be displayed in sequence from the compressed bit stream, the sequence being established by the replacement time stamp value.

8. A recipient computer according to claim 7 and further comprising:

the compressed bit stream being provided by compressing collected video data in an MPEG compressor in the camera;

the compressed bit stream including an embedded time stamp value, the embedded time stamp value including one of the following:

a Presentation Time Stamp (PTS), and a Decoding Time Stamp (DTS), the embedded time stamp value being incremented in relation to a camera time counter;

the recipient receiving a compressed bit stream including a sequence of video data headers, each video data header including the embedded time stamp value.

9. A recipient computer according to claim 7 and further comprising:

the replacement time stamp value being zero in correspondence only to the initial embedded time stamp value.

10. A recipient computer according to claim 7 and further comprising:

the media player time counter being initialized to an initial counter value of zero upon receipt of the Beginning of File marker, the replacement time stamp value being zero in correspondence only to the initial embedded time stamp value.

11. A recipient computer according to claim 7 and further comprising:

the media player application including a Microsoft media player platform, the media player time counter being initialized to an initial counter value of zero upon receipt of the Beginning of File marker, the replacement time stamp value being zero in correspondence only to the initial embedded time stamp value.

12. A recipient computer according to claim 7 and further comprising:

the dummy value being equal to a maximum file length supported by the media player application.

13. A recipient computer according to claim 7 and further comprising:

the media player application including a Microsoft media player platform having a 63-bit file length, when each variable is set to one, the maximum file length being approximately thirty thousand years.

14. A recipient computer according to claim 7 and further comprising:

the compressed bit stream transmitted from the camera over the internet protocol network in a sequence of multicast protocol data packets, each multicast protocol data packet including a multicast header identifying a multicast group address;

the recipient connecting to the multicast group address to receive the sequence of multicast protocol data packets.

15. A security system adapted to transmit video data captured by at least one camera over an internet protocol network to a plurality of recipients, the recipients being adapted to display rendered video data, the security system comprising:

the camera being operable to collect video data, the camera including an MPEG compressor operable to provide a compressed bit stream, the compressed bit stream including compressed video data;

the camera including a time stamp application suitable to embed with the compressed bit stream an embedded time stamp value, the embedded time stamp value including one of the following:

a Presentation Time Stamp (PTS), and a Decoding Time Stamp (DTS), the embedded time stamp value being incremented in relation to a camera time counter;

the camera being adapted to transmit over the network to a multicast group address the compressed bit stream including a sequence of video data headers, each video data header including the embedded time stamp value;

the recipient including an executable media player application embodied in suitable media, the recipient including a processor suitable to execute the media player application, the recipient including a media player time counter, the media player time counter being incremented in relation to a media player time source, the media player application being executable upon receipt of video data including both of the following:
- a Beginning of File marker, and
- a file length identifier, execution of the media player application with video data after receipt of both a Beginning of File marker and a file length identifier causing video data to be displayed;

the recipient including a front-end filter application embodied in suitable media, the recipient including a processor suitable to execute the front-end filter application, execution of the front-end filter application with the compressed bit stream including the sequence of video data headers causing the sequence of video data headers to be replaced with a sequence of dummy video file headers, at least one of the dummy video file headers including a Beginning of File marker, the Beginning of File marker being provided at the recipient in the at least one dummy video file header by execution of the front-end filter application, the Beginning of File marker being a dummy marker, at least one of the dummy video file headers including a file length identifier, the file length identifier being provided at the recipient in the at least one dummy video file header by execution of the front-end filter application, the file length identifier having a dummy value not greater than a maximum file length of the media player application, the dummy value being at least sufficient to enable execution of the media player with the compressed bit stream to cause video data to be displayed while the media player time counter is incremented toward the dummy value, each of the dummy video file headers including a replacement time stamp value provided by the front-end filter application, the replacement time stamp value being calculated by subtracting from each embedded time stamp value an initial embedded time stamp value, the initial embedded time stamp value being a first embedded time stamp value in the compressed bit stream received by the front-end filter application; and the recipient including the media player application, the compressed bit stream including the sequence of dummy video file headers being provided from the front-end filter application to the media player application, execution of the media player application with the compressed bit stream being enabled by the sequence of dummy video file headers, the media player time counter being initialized to an initial counter value upon receipt of the Beginning of File marker, the media player time counter incrementing from the initial counter toward the dummy value in relation to the media player time source, execution of the media player causing the video data to be displayed in sequence from the compressed bit stream, the sequence being established by the replacement time stamp value.

16. A security system according to claim 15 and further comprising:
the media player time counter being initialized to an initial counter value of zero upon receipt of the Beginning of File marker, the replacement time stamp value being zero in correspondence only to the initial embedded time stamp value.

17. A security system according to claim 15 and further comprising:
the media player application including a Microsoft media player platform, the media player time counter being initialized to an initial counter value of zero upon receipt of the Beginning of File marker, the replacement time stamp value being zero in correspondence only to the initial embedded time stamp value.

18. A security system according to claim 15 and further comprising:
the compressed bit stream being transmitted from the camera over the internet protocol network in a sequence of multicast protocol data packets, each multicast protocol data packet including a multicast header identifying a multicast group address;
the recipient being operable to connect to the multicast group address to receive the sequence of multicast protocol data packets.

19. A security system according to claim 15 and further comprising:
assigning dual level addresses to the streaming video stream, whereby the recipient selects the video to be received, by first identifies the IP address of the derived source of the streaming video signal and then obtaining an appropriate file transfer protocol from the source.

20. A security system according to claim 19 and further comprising:
at least one of a first address component and a second address component being obtained by determining an appropriate file transfer protocol from a source by a client obtaining a small file from an encoder, using FTP, TFTP or other appropriate file transfer protocol.

* * * * *